United States Patent
Zhao et al.

(10) Patent No.: US 11,970,510 B2
(45) Date of Patent: Apr. 30, 2024

(54) CATALYST COMPONENT AND CATALYST FOR OLEFIN POLYMERIZATION, AND APPLICATION THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Jin Zhao, Beijing (CN); Xianzhi Xia, Beijing (CN); Yuexiang Liu, Beijing (CN); Yang Tan, Beijing (CN); Chunhong Ren, Beijing (CN); Weili Li, Beijing (CN); Long Chen, Beijing (CN); Futang Gao, Beijing (CN); Yongtai Ling, Beijing (CN); Tao Liu, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 516 days.

(21) Appl. No.: 17/286,776

(22) PCT Filed: Oct. 15, 2019

(86) PCT No.: PCT/CN2019/111252
§ 371 (c)(1),
(2) Date: Apr. 19, 2021

(87) PCT Pub. No.: WO2020/078352
PCT Pub. Date: Apr. 23, 2020

(65) Prior Publication Data
US 2021/0340165 A1   Nov. 4, 2021

(30) Foreign Application Priority Data

Oct. 19, 2018   (CN) .......................... 201811223600.9
Oct. 19, 2018   (CN) .......................... 201811223634.8
(Continued)

(51) Int. Cl.
*C08F 10/00*   (2006.01)
*C07F 7/28*   (2006.01)
(Continued)

(52) U.S. Cl.
CPC .............. *C07F 7/28* (2013.01); *C08F 110/06* (2013.01)

(58) Field of Classification Search
CPC .............................. C08F 10/00; C08F 110/00
See application file for complete search history.

(56) References Cited

U.S. PATENT DOCUMENTS

| 4,298,718 A | 11/1981 | Mayr et al. |
| 4,425,258 A | 1/1984 | Tanaka et al. |

(Continued)

FOREIGN PATENT DOCUMENTS

| CN | 1020448 C | 5/1993 |
| CN | 1141285 A | 1/1997 |

(Continued)

*Primary Examiner* — Catherine S Branch
(74) *Attorney, Agent, or Firm* — NKL Law; Allen Xue

(57) ABSTRACT

Disclosed are a catalyst component and a catalyst for olefin polymerization, and an olefin polymerization method. The catalyst component comprises magnesium, titanium, a halogen and an internal electron donor, wherein the internal electron donor comprises a monocarboxylic acid ester compound and a diether compound, and the molar ratio of the (Continued)

monocarboxylic acid ester compound to the diether compound is (0.0035-0.7):1. By using the catalyst, a polymer having both a high isotactic index and a high melt flow index can be prepared.

24 Claims, 2 Drawing Sheets

(30) Foreign Application Priority Data

Oct. 19, 2018 (CN) .......................... 201811224578.X
Oct. 19, 2018 (CN) .......................... 201811224580.7

(51) Int. Cl.
*C08F 110/00* (2006.01)
*C08F 110/06* (2006.01)

(56) References Cited

U.S. PATENT DOCUMENTS

| | | | |
|---|---|---|---|
| 4,495,338 A | 1/1985 | Mayr et al. | |
| 9,809,663 B2 | 11/2017 | Xia et al. | |
| 2017/0121430 A1* | 5/2017 | Gupta | C08F 110/06 |
| 2018/0066084 A1 | 3/2018 | Xu | |

FOREIGN PATENT DOCUMENTS

| | | |
|---|---|---|
| CN | 1330086 A | 1/2002 |
| CN | 1436766 A | 8/2003 |
| CN | 1463990 A | 12/2003 |
| CN | 1552740 A | 12/2004 |
| CN | 1580033 A | 2/2005 |
| CN | 1580034 A | 2/2005 |
| CN | 1580035 A | 2/2005 |
| CN | 100348624 C | 11/2007 |
| CN | 102796210 A | 11/2012 |
| CN | 103012632 A | 4/2013 |
| CN | 102124036 B | 8/2013 |
| CN | 107629153 A | 1/2018 |
| JP | 2002509578 A | 3/2002 |
| JP | 2013508477 A | 3/2013 |
| RU | 2298014 C2 | 4/2007 |
| RU | 2668082 C2 | 9/2018 |
| RU | 2674026 C2 | 12/2018 |
| WO | 2015177732 A1 | 11/2015 |
| WO | 2018067367 A1 | 4/2018 |

* cited by examiner

CATALYST COMPONENT AND CATALYST FOR OLEFIN POLYMERIZATION, AND APPLICATION THEREOF

CROSS-REFERENCE TO RELATED APPLICATIONS

The present application is a U.S. national phrase entry of International Application No. PCT/CN2019/111252, filed on Oct. 15, 2019, which claims the priorities to the following patent applications filed on Oct. 19, 2018.
1. Chinese patent application CN201811224580.7 entitled "Catalyst component and catalyst for olefin polymerization and use thereof, and olefin polymerization method";
2. Chinese patent application CN201811224578.X entitled "Catalyst component and catalyst for olefin polymerization and use thereof, and olefin polymerization method";
3. Chinese patent application CN201811223634.8 entitled "Catalyst component and catalyst for olefin polymerization and use thereof, and olefin polymerization method"; and
4. Chinese patent application CN201811223600.9 entitled "Catalyst component and catalyst for olefin polymerization and use thereof, and olefin polymerization method".

The entire contents of the above patent applications are incorporated herein by reference.

FIELD OF THE INVENTION

The present invention belongs to the field of petrochemical engineering, and in particular relates to a catalyst component for olefin polymerization, a catalyst comprising the catalyst component, and use thereof.

BACKGROUND OF THE INVENTION

In plastic processing, melt flow rate is an important indicator used to evaluate fluidity of a plastic melt, and it is also an important factor in selecting materials and grades of materials for plastic processing. Melt flow rate depends mainly on the molecular weight of a polymer, and a low-molecular weight polymer has a high melt flow rate. In order to obtain an olefin polymer with a high melt flow rate, it is usually necessary to add a large amount of hydrogen during polymerization to enable the polymer to have a low molecular weight. However, an upper limit of the amount of hydrogen that can be added is limited by pressure resistance of a polymerization reactor. Partial pressure of an olefin gas that is polymerized has to be lowered in order to add more hydrogen, in which case productivity will be decreased. Besides, the addition of a large amount of hydrogen can lead to low isotacticity of an obtained polypropylene, thereby resulting in unqualified products. It is therefore in an urgent need to develop a catalyst having a high hydrogen response (i.e., use of a small amount of hydrogen can result in a polymer with a high melt flow rate) and a high stereospecificity (i.e., under a polymerization condition with the presence of a large amount of hydrogen, the polymer can still exhibit high isotacticity).

U.S. Pat. Nos. 4,298,718 and 4,495,338 disclose a Ziegler-Natta catalyst using a magnesium halide as a carrier. The catalyst produced by reacting the carrier with titanium tetrachloride exhibits a relatively high catalytic activity in catalyzing the polymerization of propylene, but isotacticity of the obtained polypropylene is relatively low. This indicates that the catalyst has low stereospecificity. Later, by adding an electron donor compound (such as ethyl benzoate or phthalate) during the preparation of the Ziegler-Natta catalyst to form a solid titanium catalyst, and by adding another electron donor (alkoxysilane compound) during olefin polymerization, researchers obtains polypropylene with relatively high isotacticity when propylene polymerization is catalyzed. This indicates that the addition of the electron donor compound improves the stereospecificity of the catalyst. Compared with a monoester internal electron donor, a diester internal electron donor is more helpful in improving the stereospecificity of the catalyst. However, this type of catalyst does not have sufficient hydrogen response, and can hardly be used to produce products with a high melt index by a direct hydrogen regulation method. Further, according to research, phthalate compounds (plasticizers) can cause serious damage to the growth and development as well as the reproductive system of animals, and may also have similar effects on humans.

CN1580034A, CN1580035A, CN1580033A, CN1436766A, and CN1552740A each disclose use of diol ester compound as an electron donor of a Ziegler-Natta catalyst for propylene polymerization. The catalyst is characterized by a high polymerization activity and the polymerization product has a wide molecular weight distribution. But when a spherical catalyst comprising a carboxylate diol ester internal electron donor is used for propylene polymerization, the catalyst exhibits relatively low stereospecificity and results in polypropylene having low isotacticity.

SUMMARY OF THE INVENTION

In order to overcome the above-mentioned defects in the existing technologies, the present invention provides a catalyst component for olefin polymerization, a catalyst comprising the catalyst component, and an olefin polymerization method. The catalyst component has both high hydrogen response and high stereospecificity, and does not comprise a phthalate compound (a plasticizer).

The inventor of the present invention unexpectedly found during research that when the internal electron donor comprises a monocarboxylic ester compound and a diether compound, and when a molar ratio of the monocarboxylic ester compound to the diether compound is in a specific range namely (0.0035-0.7):1, the two internal electron donors can work together perfectly to improve the hydrogen response and stereospecificity of the catalyst in a more effective way. Especially when compared with a catalyst that comprises a monocarboxylic ester compound alone as an internal electron donor or a catalyst that comprises a diether compound alone as an internal electron donor, a catalyst comprising a monocarboxylic ester compound and a diether compound with a molar ratio of the monocarboxylic ester compound to the diether compound being (0.0035-0.7):1 has a significantly improved stereospecificity. That is, the two internal electron donors realize a synergistic effect in improving the stereospecificity of the catalyst. Meanwhile, the hydrogen response of the catalyst is still maintained at a high level.

Based on the above, the present invention, in its first aspect, provides a catalyst component for olefin polymerization. The catalyst component comprises magnesium, titanium, a halogen, and an internal electron donor. The internal electron donor comprises a monocarboxylic ester compound and a diether compound. A molar ratio of the monocarboxylic ester compound to the diether compound is (0.0035-0.7):1.

The present invention, in its second aspect, provides a catalyst for olefin polymerization. The catalyst comprises:
(1) the catalyst component according to the first aspect of the present invention;
(2) at least one alkyl aluminum compound; and
(3) an optional external electron donor compound.

The present invention, in its third aspect, provides use of the catalyst according to the second aspect of the present invention in olefin polymerization.

The present invention, in its fourth aspect, provides an olefin polymerization method. The method comprises contacting one or more olefins with the catalyst according to the second aspect of the present invention under an olefin polymerization condition.

BRIEF DESCRIPTION OF THE DRAWINGS

Exemplary embodiments of the present invention will be described in more detail with reference to the accompanying drawings.

DETAILED DESCRIPTION OF THE EMBODIMENTS

Figure 1:
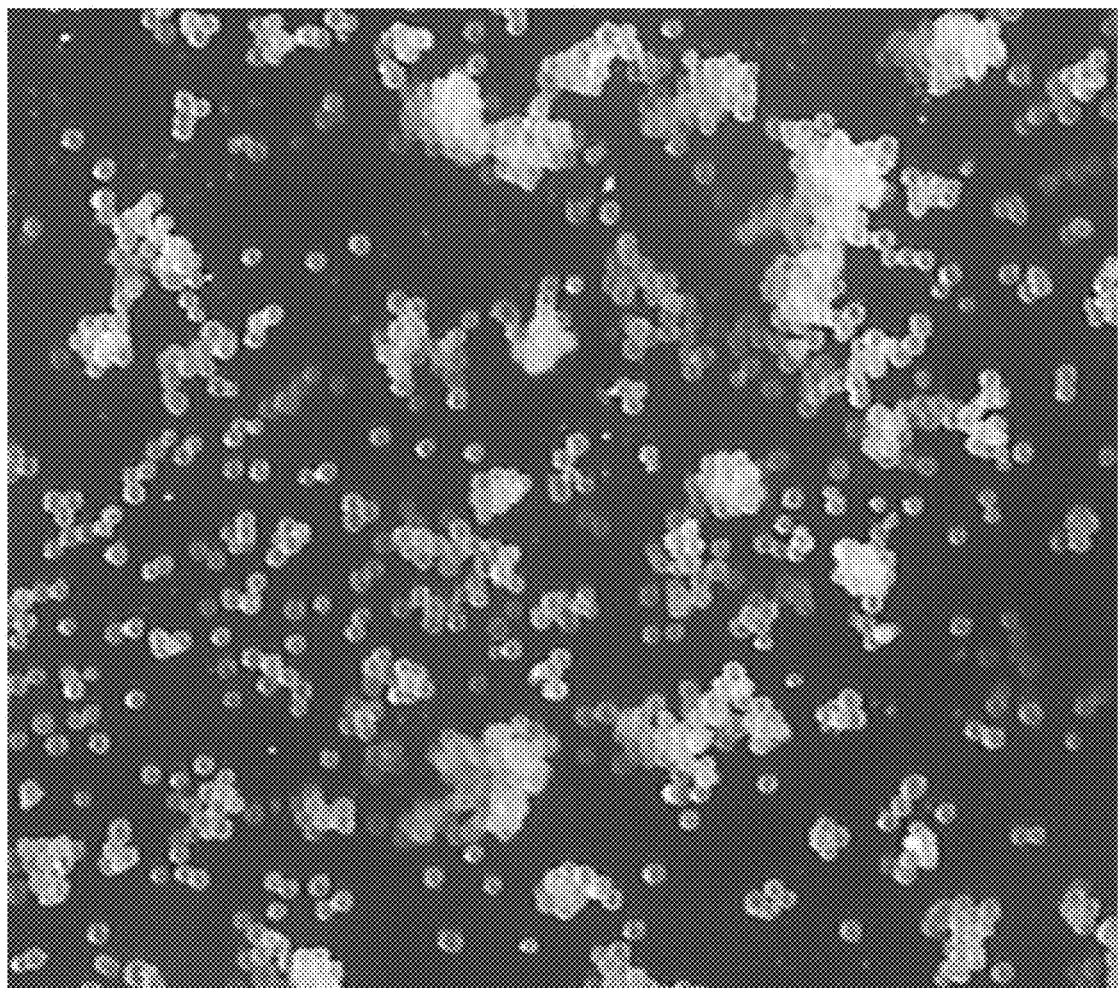
FIG. 1 is an optical microscope photograph of a spherical carrier (i.e., a magnesium source) for an olefin polymerization catalyst prepared in Preparation Example 1.

The present invention, in its first aspect, provides a catalyst component for olefin polymerization. The catalyst component comprises magnesium, titanium, a halogen, and an internal electron donor. The internal electron donor comprises a monocarboxylic ester compound and a diether compound. A molar ratio of the monocarboxylic ester compound to the diether compound is (0.0035-0.7):1.

According to some embodiments of the catalyst component of the present invention, the molar ratio of the monocarboxylic ester compound to the diether compound is (0.004-0.7):1, preferably (0.0045-0.6):1, more preferably (0.005-0.5):1, further more preferably (0.01-0.35):1. According to a most preferred embodiment, the molar ratio of the monocarboxylic ester compound to the diether compound is (0.02-0.25):1. When the molar ratio of the monocarboxylic ester compound to the diether compound is within the foregoing specific range, the two internal electron donors can work perfectly together to more effectively improve hydrogen response and stereospecificity of a catalyst, and in particular significantly improve the stereospecificity of the catalyst, i.e., significantly improve the isotacticity of a prepared polymer. The molar ratio of the monocarboxylic ester compound to the diether compound may exemplarily be 0.0035:1, 0.004:1, 0.0045:1, 0.005:1, 0.008:1, 0.01:1, 0.012:1, 0.015:1, 0.020:1, 0.023:1, 0.03:1, 0.04:1, 0.05:1, 0.06:1, 0.07:1, 0.08:1, 0.09:1, 0.10:1, 0.11:1, 0.12:1, 0.15:1, 0.18:1, 0.20:1, 0.23:1, 0.24:1, 0.25:1, 0.28:1, 0.30:1, 0.32:1, 0.34:1, 0.36:1, 0.40:1, 0.42:1, 0.44:1, 0.46:1, 0.48:1, 0.50:1, 0.55:1, 0.60:1, 0.65:1, etc.

According to some embodiments of the catalyst component of the present invention, the diether compound is a 1,3-diether compound, preferably a diether compound as shown in Formula I.

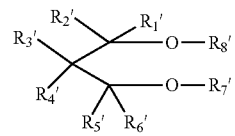

Formula I

In formula I,
$R_1'$, $R_2'$, $R_3'$, $R_4'$, $R_5'$ and $R_6'$ are identical to or different from each other, each independently selected from a group consisting of hydrogen, halogen, substituted or unsubstituted $C_1$-$C_{20}$ linear or branched alkyl, substituted or unsubstituted $C_3$-$C_{20}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl, preferably selected from a group consisting of hydrogen, halogen, substituted or unsubstituted $C_1$-$C_{18}$ linear or branched alkyl, substituted or unsubstituted $C_3$-$C_{18}$ cycloalkyl, substituted or unsubstituted $C_6$-$C_{18}$ aryl, substituted or unsubstituted $C_7$-$C_{18}$ aralkyl, and substituted or unsubstituted $C_7$-$C_{18}$ alkaryl; or, two or more of $R_1'$, $R_2'$, $R_3'$, $R_4'$, $R_5'$ and $R_6'$ are bonded to each other to form a ring.

$R_7'$ and $R_8'$ are identical to or different from each other, each independently selected from a group consisting of substituted or unsubstituted $C_1$-$C_{20}$ linear or branched alkyl, substituted or unsubstituted $C_3$-$C_{20}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl, preferably selected from a group consisting of substituted or unsubstituted $C_1$-$C_{10}$ linear or branched alkyl, substituted or unsubstituted $C_3$-$C_{10}$ cycloalkyl, substituted or unsubstituted $C_6$-$C_{15}$ aryl, substituted or unsubstituted $C_7$-$C_{18}$ aralkyl, and substituted or unsubstituted $C_7$-$C_{15}$ alkaryl.

According to some preferred embodiments of the catalyst component of the present invention, the diether compound is a 1,3-diether compound as shown in Formula II.

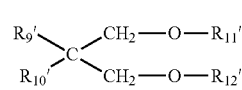

Formula II

In Formula II, $R_9'$ and $R_{10}'$ are identical to or different from each other, each independently selected from a group consisting of hydrogen, halogen, substituted or unsubstituted $C_1$-$C_{18}$ linear or branched alkyl, substituted or unsubstituted $C_3$-$C_{18}$ cycloalkyl, substituted or unsubstituted $C_6$-$C_{18}$ aryl, substituted or unsubstituted $C_7$-$C_{18}$ aralkyl, and substituted or unsubstituted $C_7$-$C_{18}$ alkaryl, preferably selected from a group consisting of hydrogen, halogen, substituted or unsubstituted $C_1$-$C_{10}$ linear or branched alkyl, substituted or unsubstituted $C_3$-$C_{10}$ cycloalkyl, substituted or unsubstituted $C_6$-$C_{15}$ aryl, substituted or unsubstituted $C_7$-$C_{15}$ aralkyl, and substituted or unsubstituted $C_7$-$C_{15}$ alkaryl; or, $R_9'$ and $R_{10}'$ are bonded to each other to form a ring; preferably $R_9'$ and $R_{10}'$ are bonded to each other to form a fluorene ring;

$R_{11}'$ and $R_{12}'$ are identical to or different from each other, each independently being substituted or unsubstituted $C_1$-$C_{10}$ linear or branched alkyl.

According to the present invention, examples of the diether compound may include but be not limited to: 2-(2-ethylhexyl)-1,3-dimethoxypropane, 2-isopropyl-1,3-dimethoxypropane, 2-butyl-1,3-dimethoxypropane, 2-sec-butyl- 1,3-dimethoxypropane, 2-cyclohexyl-1,3-dimethoxypropane, 2-phenyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2,2-dicyclohexyl-1,3-dimethoxypropane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2-isobutyl-2-isopropyl-1,3-dimethoxypropane, 2-(1-methylbutyl)-2-isopropyl-1,3-dimethoxypropane, 2-isopropyl-2-isopentyl-1,3-dimethoxypropane, 2-phenyl-2-isopropyl-1,3-dimethoxypropane, 2-phenyl-2-sec-butyl-1,3-dimethoxypropane, 2-benzyl-2-isopropyl-1,3-dimethoxypropane, 2-cyclopentyl-2-isopropyl-1,3-dimethoxypropane, 2-cyclopentyl-2-sec-butyl 1,3-dimethoxypropane, 2-cyclohexyl-2-isopropyl-1,3-dimethoxypropane, 2-cyclohexyl-2-sec-butyl-1,3-dimethoxypropane, 2-isopropyl-2-sec-butyl-1,3-dimethoxypropane, 2-cyclohexyl-2-cyclohexyl methyl-1,3-dimethoxypropane, and 9,9-dimethoxymethyl fluorene.

Most preferably, the diether compound is 2-isopropyl-2-isopentyl-1,3-dimethoxypropane and/or 9,9-dimethoxymethylfluorene.

In the present invention, the 1,3-diether compound may be synthesized by a method which can be found in the disclosure of CN1020448C, CN100348624C and CN1141285A. Contents disclosed by all these patent applications are incorporated herein by reference, and will not be repeated herein.

According to some embodiments of the catalyst component of the present invention, the monocarboxylic ester compound is selected from an aromatic monocarboxylic ester and an aliphatic monocarboxylic ester. Preferably, the aliphatic monocarboxylic ester is a monoester formed by an aliphatic monocarboxylic acid having 2-10 carbon atoms and an aliphatic mono- or polyhydric alcohol having 1-15 carbon atoms or an aromatic alcohol having 6-15 carbon atoms. Preferably, the aromatic monocarboxylic ester is a monoester formed by an aromatic monocarboxylic acid having 7-10 carbon atoms and an aliphatic mono- or polyhydric alcohol having 1-15 carbon atoms or an aromatic alcohol having 6-15 carbon atoms.

According to some embodiments of the catalyst component of the present invention, the aliphatic monocarboxylic ester is a monoester formed by an aliphatic monocarboxylic acid having 2-10 carbon atoms and an aliphatic mono- or polyhydric alcohol having 1-15 carbon atoms or an aromatic alcohol having 6-15 carbon atoms.

According to some embodiments of the catalyst component of the present invention, the aromatic monocarboxylic ester is a monoester formed by an aromatic monocarboxylic acid having 7-10 carbon atoms and an aliphatic mono- or polyhydric alcohol having 1-15 carbon atoms or an aromatic alcohol having 6-15 carbon atoms.

According to some embodiments of the catalyst component of the present invention, the aromatic monocarboxylic ester is an aromatic monocarboxylic ester as shown in Formula III.

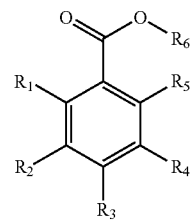

Formula III

In Formula III, $R_1$-$R_5$ are identical to or different from each other, each independently selected from a group consisting of hydrogen, hydroxyl, halogen, amino, substituted or unsubstituted $C_1$-$C_{10}$ linear or branched alkyl, substituted or unsubstituted $C_1$-$C_{10}$ alkoxy, substituted or unsubstituted $C_3$-$C_{10}$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl; or any two of $R_1$-$R_5$ form an aromatic ring or an aliphatic ring; $R_6$ is selected from a group consisting of substituted or unsubstituted $C_1$-$C_{10}$ linear or branched alkyl, substituted or unsubstituted $C_3$-$C_{10}$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl, preferably selected from substituted or unsubstituted $C_1$-$C_6$ linear or branched alkyl.

The aromatic monocarboxylic ester may specifically be at least one selected from a group consisting of benzoate, o-hydroxybenzoate, o-methoxybenzoate, and o-ethoxybenzoate.

According to the present invention, the internal electron donor comprises a diether compound and a monocarboxylic ester compound. The diether compound and the monocarboxylic ester compound may produce a certain synergistic effect. Based on an amount of the internal electron donor, a total amount of the monocarboxylic ester compound and the diether compound is preferably 70-100% by weight, more preferably 80-100% by weight, further more preferably 90-100% by weight, most preferably 100% by weight.

According to some embodiments of the catalyst component of the present invention, the catalyst component is a product resulted from a reaction of a magnesium source, a titanium source, and the internal electron donor.

According to some embodiments of the catalyst component of the present invention, the magnesium source comprises one or more magnesium compounds selected from a group consisting of magnesium dihalide, magnesium alkoxide, magnesium alkyl, a hydrate or alcoholate of magnesium dihalide, and a derivative derived by substituting a halogen atom in a formula of magnesium dihalide with alkoxy or halogenated alkoxy.

According to some embodiments of the catalyst component of the present invention, the magnesium source comprises a magnesium compound as shown in Formula IV.

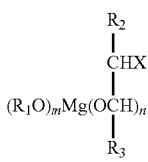

Formula IV

In Formula IV,

R$_1$ is selected from a group consisting of substituted or unsubstituted C$_1$-C$_{10}$ linear alkyl, substituted or unsubstituted C$_3$-C$_{10}$ branched alkyl, substituted or unsubstituted C$_3$-C$_{10}$ cycloalkyl, substituted or unsubstituted C$_6$-C$_{20}$ aryl, substituted or unsubstituted C$_7$-C$_{20}$ aralkyl, and substituted or unsubstituted C$_7$-C$_{20}$ alkaryl; preferably, R$_1$ is selected from a group consisting of substituted or unsubstituted C$_1$-C$_8$ linear alkyl, substituted or unsubstituted C$_3$-C$_8$ branched alkyl, substituted or unsubstituted C$_3$-C$_8$ cycloalkyl, substituted or unsubstituted C$_6$-C$_{15}$ aryl, substituted or unsubstituted C$_7$-C$_{18}$ aralkyl, and substituted or unsubstituted C$_7$-C$_{15}$ alkaryl; more preferably, R$_1$ is selected from a group consisting of substituted or unsubstituted C$_1$-C$_6$ linear alkyl, substituted or unsubstituted C$_3$-C$_6$ branched alkyl, substituted or unsubstituted C$_3$-C$_6$ cycloalkyl, substituted or unsubstituted C$_6$-C$_{10}$ aryl, substituted or unsubstituted C$_7$-C$_{10}$ aralkyl, and substituted or unsubstituted C$_7$-C$_{10}$ alkaryl.

R$_2$ and R$_3$ are identical to or different from each other, each independently selected from a group consisting of hydrogen, substituted or unsubstituted C$_1$-C$_{10}$ linear alkyl, substituted or unsubstituted C$_3$-C$_{10}$ branched alkyl, substituted or unsubstituted C$_3$-C$_{10}$ cycloalkyl, substituted or unsubstituted C$_6$-C$_{20}$ aryl, substituted or unsubstituted C$_7$-C$_{20}$ aralkyl, and substituted or unsubstituted C$_7$-C$_{20}$ alkaryl; preferably, R$_2$ and R$_3$ are each independently selected from a group consisting of hydrogen, substituted or unsubstituted C$_1$-C$_{10}$ linear alkyl, substituted or unsubstituted C$_3$-C$_8$ branched alkyl, substituted or unsubstituted C$_3$-C$_8$ cycloalkyl, substituted or unsubstituted C$_6$-C$_{10}$ aryl, substituted or unsubstituted C$_7$-C$_{10}$ aralkyl, and substituted or unsubstituted C$_7$-C$_{10}$ alkaryl; more preferably, R$_2$ and R$_3$ are each independently selected from a group consisting of hydrogen, substituted or unsubstituted C$_1$-C$_6$ linear alkyl, substituted or unsubstituted C$_3$-C$_6$ branched alkyl, substituted or unsubstituted C$_3$-C$_6$ cycloalkyl, substituted or unsubstituted C$_6$-C$_8$ aryl, substituted or unsubstituted C$_7$-C$_9$ aralkyl, and substituted or unsubstituted C$_7$-C$_9$ alkylaryl.

X is a halogen, preferably chlorine or bromine.

m is 0.1-1.9; n is 0.1-1.9; and m+n=2.

According to some embodiments of the catalyst component of the present invention, the titanium source comprises titanium halide, titanium alkoxide halide, and titanium alkoxide. More preferably, the titanium source comprises a compound represented by a general formula Ti(OR')$_{3-a}$Z$_a$ and/or Ti(OR')$_{4-b}$Z$_b$, where R' is C$_1$-C$_{20}$ alkyl; Z is F, Cl, Br or I; a is an integer from 1 to 3; and b is an integer from 1 to 4.

According to some embodiments of the catalyst component of the present invention, the magnesium source further comprises sulfur. A molar ratio of sulfur to magnesium in the magnesium source is q:1, where 0≤q≤0.5, preferably 0.001<q≤0.2. The inventor of the present invention unexpectedly found in research that sulfur added during preparation of a carrier (a magnesium source) for an olefin polymerization catalyst can reduce collision probability among unshaped particles and reduce adhesion among carrier particles, so that resulting carrier particles have a small particle size, a narrow particle size distribution, and good morphology. The carrier particles prepared in this way are good in morphology and smooth at surface, and among them there are basically no nonspherical particles. Besides, the particle size of the carrier particles can be less than 20 microns, and the particle size distribution is narrow.

According to some embodiments of the catalyst component of the present invention, the magnesium source is prepared by a method including the following steps:

(1) A mixture is prepared. The mixture comprises elemental sulfur, a magnesium halide represented by a general formula MgX$_1$Y, a compound represented by a general formula R$_1$OH, an optional inert liquid medium, and an optional surfactant. Preferably, the mixture is obtained by mixing the elemental sulfur, the magnesium halide represented by the general formula MgX$_1$Y, the compound represented by the general formula R$_1$OH, the optional inert liquid medium, and the optional surfactant together at one time or step by step and then heating a resulting mixture.

(2) The mixture obtained in step (1) is subjected to a contact reaction with an ethylene oxide compound.

In the general formula MgX$_1$Y, X$_1$ is halogen, preferably chlorine or bromine; Y is selected from a group consisting of halogen, substituted or unsubstituted C$_1$-C$_{10}$ linear alkyl, substituted or unsubstituted C$_3$-C$_{10}$ branched alkyl, substituted or unsubstituted C$_3$-C$_{10}$ cycloalkyl, substituted or unsubstituted C$_6$-C$_{20}$ aryl, substituted or unsubstituted C$_1$-C$_{10}$ alkoxy, substituted or unsubstituted C$_6$-C$_{20}$ aryloxy, substituted or unsubstituted C$_7$-C$_{20}$ aralkyl, and substituted or unsubstituted C$_7$-C$_{20}$ alkaryl.

In the general formula R$_1$OH, R$_1$ is selected from a group consisting of substituted or unsubstituted C$_1$-C$_{10}$ linear alkyl, substituted or unsubstituted C$_3$-C$_{10}$ branched alkyl, substituted or unsubstituted C$_3$-C$_{10}$ cycloalkyl, substituted or unsubstituted C$_6$-C$_{20}$ aryl, substituted or unsubstituted C$_7$-C$_{20}$ aralkyl, and substituted or unsubstituted C$_7$-C$_{20}$ alkaryl; preferably, R$_1$ is selected from a group consisting of substituted or unsubstituted C$_1$-C$_8$ linear alkyl, substituted or unsubstituted C$_3$-C$_8$ branched alkyl, substituted or unsubstituted C$_3$-C$_8$ cycloalkyl, substituted or unsubstituted C$_6$-C$_{18}$ aryl, substituted or unsubstituted C$_7$-C$_{18}$ aralkyl, and substituted or unsubstituted C$_7$-C$_{18}$ alkaryl; more preferably, R$_1$ is selected from a group consisting of substituted or unsubstituted C$_1$-C$_6$ linear alkyl, substituted or unsubstituted C$_3$-C$_6$ branched alkyl, substituted or unsubstituted C$_3$-C$_6$ cycloalkyl, substituted or unsubstituted C$_6$-C$_{10}$ aryl, substituted or unsubstituted C$_7$-C$_{10}$ aralkyl, and substituted or unsubstituted C$_7$-C$_{10}$ alkaryl.

The ethylene oxide compound has a structure shown in Formula V.

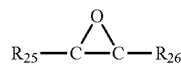

V

In Formula V, R$_{25}$ and R$_{26}$ are each independently selected from a group consisting of hydrogen, substituted or unsubstituted C$_1$-C$_{10}$ linear alkyl, substituted or unsubstituted C$_3$-C$_{10}$ branched alkyl, substituted or unsubstituted C$_3$-C$_{10}$ cycloalkyl, substituted or unsubstituted C$_6$-C$_{20}$ aryl, substituted or unsubstituted C$_7$-C$_{20}$ aralkyl, and substituted or unsubstituted C$_7$-C$_{20}$ alkaryl; preferably, R$_{25}$ and R$_{26}$ are each independently selected from a group consisting of hydrogen, substituted or unsubstituted C$_1$-C$_8$ linear alkyl, substituted or unsubstituted $C_3$-$C_8$ branched alkyl, substituted or unsubstituted $C_3$-$C_8$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl; more preferably, $R_{25}$ and $R_{26}$ are each independently selected from a group consisting of hydrogen, substituted or unsubstituted $C_1$-$C_6$ linear alkyl, substituted or unsubstituted $C_3$-$C_6$ branched alkyl, substituted or unsubstituted $C_3$-$C_6$ cycloalkyl, substituted or unsubstituted $C_6$-$C_8$ aryl, substituted or unsubstituted $C_7$-$C_9$ aralkyl, and substituted or unsubstituted $C_7$-$C_9$ alkylaryl.

According to some embodiments of the catalyst component of the present invention, in the general formula $MgX_1Y$, $X_1$ is chlorine or bromine, and Y is chlorine, bromine, $C_1$-$C_5$ alkoxy or $C_6$-$C_{10}$ aryloxy. Preferably, the magnesium halide represented by the general formula $MgX_1Y$ is at least one selected from a group consisting of magnesium chloride, magnesium bromide, phenoxymagnesium chloride, isopropoxymagnesium chloride, and n-butoxymagnesium chloride.

According to some embodiments of the catalyst component of the present invention, in the general formula $R_1OH$, $R_1$ is $C_1$-$C_8$ alkyl. Preferably, the compound represented by the general formula $R_1OH$ is at least one selected from a group consisting of ethanol, n-propanol, isopropanol, n-butanol, isobutanol, n-pentanol, isopentanol, n-hexanol, 2-ethylhexanol, and n-octanol.

According to some embodiments of the catalyst component of the present invention, in the ethylene oxide compound having the structure represented by Formula V, $R_{25}$ and $R_{26}$ are each independently hydrogen, $C_1$-$C_3$ alkyl, or $C_1$-$C_3$ halogenated alkyl. Preferably, the ethylene oxide compound is at least one selected from a group consisting of ethylene oxide, epoxypropane, epoxybutane, epoxychloropropane, epoxychlorobutane, epoxybromopropane, and epoxybromobutane.

According to the present invention, contents of the above-mentioned components in the magnesium source of the catalyst for olefin polymerization may be selected and varied within a relatively wide range. Preferably, based on 1 mol of the magnesium halide represented by the general formula $MgX_1Y$, the elemental sulfur is present in an amount of 0.0001-0.5 mol, the compound represented by the general formula $R_1OH$ is present in an amount of 4-30 mol, and the ethylene oxide compound is present in an amount of 1-10 mol. More preferably, based on 1 mol of the magnesium halide represented by the general formula $MgX_1Y$, the compound represented by the general formula $R_1OH$ is present in an amount of 6-20 mol, and the ethylene oxide compound is present in an amount of 2-6 mol.

According to the present invention, in step (1), conditions for heating the mixture of the elemental sulfur, the magnesium halide represented by the general formula $MgX_1Y$, the compound represented by the general formula $R_1OH$, and the optional inert liquid medium and/or the surfactant are not limited, so long as the conditions for the heating are such that the magnesium halide represented by the general formula $MgX_1Y$ melts and sufficiently reacts with sulfur. According to some embodiments of the catalyst component of the present invention, in step (1), the heating is conducted at a temperature of 80-120° C. for a time period of 0.5-5 hours, preferably at a temperature of 80-100° C. for 0.5-3 hours.

According to the present invention, in step (2), conditions for the contact reaction of the mixture with the ethylene oxide compound may be any existing conditions that can be used to form a carrier for an olefin polymerization catalyst. According to some embodiments of the catalyst component of the present invention, in step (2), the conditions for the contact reaction include reacting at temperature of 40-120° C. for a time period of 15-60 minutes, preferably reacting at a temperature of 60-100° C. for a time period of 20-50 minutes.

According to the present invention, the method may further include subjecting the product obtained from the contact reaction to solid-liquid separation, and washing and drying a solid phase product obtained from the separation. The solid-liquid separation may be realized by any existing method capable of separating a solid phase from a liquid phase, such as suction filtration, filter pressing, or centrifugal separation. Preferably, the method of the solid-liquid separation is filter pressing. Conditions for the filter pressing are not particularly limited in the present invention so long as a solid phase and a liquid phase can be separated as fully as possible. The washing may be realized by a method well known to those skilled in the art which can be used to wash the obtained solid phase product. For example, an inert hydrocarbon solvent (such as pentane, hexane, heptane, petroleum ether, and gasoline) may be used to wash the obtained solid phase product. Conditions for the drying are not particularly limited in the present invention. For example, the drying may be conducted at a temperature of 20-70° C. for a period of time of 0.5-10 hours. According to the present invention, the drying may be conducted at a normal pressure or a reduced pressure.

Preferably, solid component particles obtained in the above process of preparing the solid component are washed with an inert hydrocarbon solvent (such as hexane, heptane, octane, decane, toluene, etc.) and dried, and then used in a subsequent step (2) to prepare the catalyst component for olefin polymerization.

In the present invention, the elemental sulfur may be any subtype of elemental sulfur, including but not limited to at least one of α-sulfur, β-sulfur, γ-sulfur, and polymeric sulfur. The elemental sulfur may be anhydrous elemental sulfur or elemental sulfur containing bound water. The elemental sulfur may be commercially available.

According to the present invention, the inert liquid medium may be any liquid medium commonly used in the art that does not chemically react with reactants and products of the reaction. According to some embodiments of the catalyst component of the present invention, the inert liquid medium is a silicone oil solvent and/or a hydrocarbon solvent. Preferably, the inert liquid medium is at least one selected from a group consisting of kerosene, paraffin oil, petrolatum oil, white oil, methyl silicone oil, ethyl silicone oil, methyl ethyl silicone oil, phenyl silicone oil, and methyl phenyl silicone.

According to some embodiments of the catalyst component of the present invention, based on 1 mol of the magnesium halide represented by the general formula $MgX_1Y$, the inert liquid medium is present in an amount of 0.8-10 L.

According to some embodiments of the catalyst component of the present invention, the surfactant is at least one selected from a group consisting of polyvinylpyrrolidone, polyethylene glycol, polyvinyl alcohol, polyacrylic acid, polyacrylate, polyacrylamide, polystyrene sulfonate, naphthalenesulfonic acid formaldehyde condensate, condensed alkyl phenyl ether sulfate, condensed alkyl phenol polyoxyethylene ether phosphate, oxyalkyl acrylate copolymer modified polyethyleneimine, 1-dodeca-4-vinylpyridine bromide polymer, polyvinylbenzyltrimethylamine salt, polyethylene oxide propylene oxide block copolymer, polyvinylpyrrolidone vinyl acetate copolymer, alkyl phenyl polyoxyethylene ether, and polyalkyl methacrylate.

According to some embodiments of the catalyst component of the present invention, based on 1 mol of the magnesium halide represented by the general formula MgX$_1$Y, the surfactant is present in an amount of 1-20 g.

An average particle size of the spherical carrier for the olefin polymerization catalyst of the present invention may be controlled within a wide range, for example, within a range of 10-100 microns. According to a preferred embodiment of the present invention, an average particle diameter (D50) of the spherical carrier for the olefin polymerization catalyst of the present invention may be controlled to be less than or equal to 30 microns, preferably less than or equal to 20 microns, and a particle size distribution ((D90-D10)/D50) thereof may be controlled to be less than 1.2, preferably less than or equal to 0.8. In this preferred embodiment, the catalyst prepared from the spherical carrier for the olefin polymerization catalyst can be used to obtain an olefin polymer having a higher bulk density. In the present invention, the average particle diameter and a particle size distribution of the spherical carrier for the olefin polymerization catalyst may be measured with a particle size analyzer namely Master Sizer 2000 laser (manufactured by Malvern Instruments Ltd).

When the solid component (the carrier for the olefin polymerization catalyst) is spherical particles, the catalyst component obtained by reacting the carrier with the titanium compound, the monocarboxylic ester compound, and the diether compound is also spherical particles. Moreover, due to the smaller particle size and the narrow particle size distribution of the spherical carrier, the prepared catalyst component also has a relatively small particle size and a relatively narrow particle size distribution.

According to the present invention, the spherical carrier for the olefin polymerization catalyst may contain water coming from a trace water carried by a raw material used in the synthesis and a reaction media. According to the present invention, the trace water in the above-mentioned reactants may also participate in the reaction to form the spherical carrier for the olefin polymerization catalyst.

In the present invention, in the catalyst component for olefin polymerization, contents of magnesium, titanium, the halogen, and the internal electron donor are not particularly limited, and can be reasonably selected according to conventional used amounts in the art. Preferably, in the catalyst component, a weight ratio of titanium as titanium element, to magnesium as magnesium element, to the halogen, and to the internal electron donor is 1:(2-15):(8-30):(2-15), preferably 1:(3-12):(10-25):(3-13). More preferably, a weight ratio of titanium as titanium element, to magnesium as magnesium element, and to the internal electron donor is 1:(4-10):(4-10). In the present invention, the titanium compound may be a titanium compound commonly used in the art. Preferably, the titanium compound is a compound represented by Formula XI and/or Formula XII.

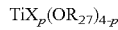  Formula XI

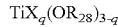  Formula XII

In Formula XI and Formula XII, X is a halogen; $R_{27}$ and $R_{28}$ are each independently $C_1$-$C_{20}$ alkyl; p is an integer from 1 to 4; and q is an integer from 1 to 3.

Further preferably, the titanium compound is one or more selected from a group consisting of titanium tetrachloride, titanium tetrabromide, titanium tetraiodide, tributoxy titanium chloride, dibutoxy titanium dichloride, butoxy titanium trichloride, triethoxy titanium chloride, diethoxy titanium dichloride, ethoxy titanium trichloride, and titanium trichloride. Most preferably, the titanium compound is titanium tetrachloride.

A method for preparing the catalyst component for olefin polymerization of the present invention may include the following steps. A magnesium compound and a titanium compound are subjected to a reaction. In one or more time periods before, during, and after the reaction of the magnesium compound with the titanium compound, an internal electron donor is added. The internal electron donor comprises the above-mentioned monocarboxylic ester compound and the above-mentioned diether compound. In the present invention, the reaction of the magnesium compound and the titanium compound may be carried out by a method disclosed in the prior arts. For example, the titanium compound may be cooled to a temperature below 0° C. (preferably to a temperature ranging from −5° C. to −25° C.), followed by adding the magnesium compound. A resulting mixture is stirred and mixed at this temperature for 10-60 minutes, and then heated to a reaction temperature (preferably 60-130° C.) and maintained at this reaction temperature for 0.5-10 hours. During the heating, the monocarboxylic ester compound and the diether compound are added. Then, the titanium compound is added, and a resulting mixture is treated one or more times. Finally, the treated mixture is washed with an inert solvent multiple times to obtain the catalyst component. Examples of the inert solvent may include but are not limited to hexane, heptane, octane, decane, and toluene.

In the method for preparing the catalyst component for olefin polymerization, the internal electron donor component is added in one or more time periods before, during, and after the reaction of the magnesium compound with the titanium compound. A time period before the reaction of the magnesium compound with the titanium compound refers to a time period after the magnesium compound is added to a reactor but before the temperature is raised to the reaction temperature.

In one embodiment, in order that the prepared catalyst component can be used in olefin polymerization to obtain an olefin polymer having higher isotacticity, step (2) includes adding an internal electron donor at least comprising a monocarboxylic ester compound and a diether compound in one or more time periods before, during, and after the reaction of the solid component with the titanium compound. The internal electron donor at least comprising the monocarboxylic ester compound and the diether compound may be added at one time, or may be added separately in different time periods. Preferably, the internal electron donor at least comprising the monocarboxylic ester compound and the diether compound is added during heating the mixture of the solid component and the titanium compound.

Preferably, after the reaction of the solid component with the titanium compound, the method for preparing the catalyst component further includes: filtering off a liquid and recovering a solid, and then treating the recovered solid with a liquid titanium compound (such as titanium tetrachloride) one or more times, preferably two to four times; and then washing the obtained solid catalyst component multiple times with a hydrocarbon solvent. The hydrocarbon solvent may be selected from aliphatic hydrocarbons, aromatic hydrocarbons or alicyclic hydrocarbons, such as hexane, heptane, octane, decane, toluene, etc.

According to the present invention, in preparing the catalyst component, a molar ratio of the magnesium compound, to the titanium compound, and to the internal electron donor component is not particularly limited, and a content of each of these components may be varied in a wide range. Preferably, the molar ratio of the magnesium compound as magnesium element, to the titanium compound as titanium element, and to the internal electron donor is 1:(5-200):(0.04-0.6). More preferably, the molar ratio of the magnesium compound as magnesium element, to the titanium compound as titanium element, and to the internal electron donor is 1:(10-160):(0.07-0.5). Most preferably, the molar ratio of the magnesium compound as magnesium element, to the titanium compound as titanium element, and to the internal electron donor is 1:(15-120):(0.1-0.4).

In the present invention, examples of $C_1$-$C_{20}$ linear or branched alkyl may include but are not limited to: methyl, ethyl, n-propyl, isopropyl, n-butyl, sec-butyl, isobutyl, tert-butyl, n-pentyl, 1-ethylpropyl, 2-methylbutyl, 3-methylbutyl, 2,2-dimethylpropyl, n-hexyl, 2-methylpentyl, 3-methylpentyl, 4-methylpentyl, n-heptyl, 2-methylhexyl, 3-methylhexyl, 4-methylhexyl, 5-methylhexyl, n-heptyl, n-octyl, n-nonyl, n-decyl, tetrahydrogeranyl, n-dodecyl, n-tridecyl, n-tetradecyl, n-pentadecyl, n-hexadecyl, n-octadecyl, n-nonadecyl, and n-eicosyl.

In the present invention, examples of $C_2$-$C_{20}$ linear or branched alkenyl may include but are not limited to: vinyl, allyl, isopropenyl, 1-propenyl, 2-methyl-1-propenyl, 1-butenyl, 2-butenyl, 3-butenyl, 2-ethyl-1-butenyl, 3-methyl-2-butenyl, 1-pentenyl, 2-pentenyl, 3-pentenyl, 4-pentenyl, 4-methyl-3-pentenyl, 1-hexenyl, 2-hexenyl, 3-hexenyl, 4-hexenyl, 5-hexenyl, 1-heptenyl, 1-octenyl, phenylvinyl, phenyl-n-butenyl, geranyl, 1-decenyl, 1-tetradecenyl, 1-octadecenyl, 9-octadecenyl, 1-eicosenyl, and 3,7,11,15-tetramethyl-1-hexadecenyl.

In the present invention, examples of $C_3$-$C_{20}$ cycloalkyl may include but are not limited to: cyclopropyl, cyclobutyl, cyclopentyl, cyclohexyl, 4-methyl cyclohexyl, 4-ethyl cyclohexyl, 4-n-propylcyclohexyl, 4-n-butylcyclohexyl, cycloundecyl, and cyclododecyl.

In the present invention, $C_6$-$C_{20}$ aryl includes $C_6$-$C_{20}$ phenyl and $C_{10}$-$C_{20}$ fused aryl, and its examples may include but are not limited to: phenyl, naphthyl, methylnaphthyl, ethylnaphthyl, anthryl, methylanthryl, ethylanthryl, phenanthryl, methylphenanthryl, ethylphenanthryl, pyrenyl, indenyl, o-tolyl, m-tolyl, p-tolyl, o-ethylphenyl, m-ethylphenyl, p-ethylphenyl, and naphthyl.

In the present invention, $C_7$-$C_{20}$ aralkyl refers to an alkyl group having an aryl substituent with 7-20 carbon atoms. Examples of $C_7$-$C_{20}$ aralkyl may include but are not limited to: phenylmethyl, phenylethyl, phenyl n-propyl, phenyl n-butyl, phenyl t-butyl, phenylisopropyl, and phenyl n-pentyl.

In the present invention, $C_7$-$C_{20}$ alkaryl refers to an aryl group having an alkyl substituent with 7-20 carbon atoms. Examples of substituted or unsubstituted $C_7$-$C_{20}$ alkaryl may include but are not limited to: methylphenyl, ethylphenyl, n-propylphenyl, n-butylphenyl, tert-butylphenyl, isopropylphenyl, and n-pentylphenyl.

In the present invention, examples of $C_1$-$C_6$ alkoxy may include but are not limited to: methoxy, ethoxy, n-propoxy, isopropoxy, n-butoxy, sec-butoxy, isobutoxy, tert-butoxy, n-pentoxy, isopentoxy, tert-pentoxy, and hexyloxy.

In the present invention, $C_6$-$C_{10}$ aryloxy may be, for example, phenoxy or naphthoxy.

In the present invention, the term "substituted" means that one or more hydrogen atoms on a carbon atom of a described group can be substituted by a common substituent, which can be alkyl, alkoxy, halogen, amino, hydroxyl, etc., such as $C_1$-$C_6$ alkyl, $C_1$-$C_6$ alkoxy, halogen, amino, hydroxyl, etc.

In the present invention, the elemental sulfur may be any subtype of elemental sulfur, including but not limited to at least one of α-sulfur, β-sulfur, γ-sulfur, and polymeric sulfur. The elemental sulfur may be anhydrous elemental sulfur or elemental sulfur containing bound water. The elemental sulfur may be commercially available.

In the present invention, halogen is selected from fluorine, chlorine, bromine, and iodine.

In the present invention, $C_6$-$C_{10}$ aryloxy may be, for example, phenoxy or naphthoxy.

In the present invention, $C_3$-$C_8$ cycloalkyl may be, for example, cyclopentyl, cyclopentylmethyl, cyclopentylethyl, cyclohexyl, or cyclohexylmethyl.

The present invention, in its second aspect, provides a catalyst for olefin polymerization. The catalyst comprises:

(1) the catalyst component according to the first aspect of the present invention;

(2) at least one alkyl aluminum compound; and (3) and an optional external electron donor compound.

According to the present invention, in the above-mentioned catalyst for olefin polymerization, the alkyl aluminum compound may be any alkyl aluminum compound commonly used in the field of olefin polymerization that can be used as a co-catalyst for a catalyst for olefin polymerization. Preferably, the alkyl aluminum compound is a compound represented by Formula XIII

   Formula XIII

In Formula XIII, R' is $C_1$-$C_8$ alkyl or halogenated alkyl; X' is a halogen, preferably one or more selected from chlorine, bromine, and iodine, more preferably chlorine; and n' is an integer from 1 to 3.

More preferably, the alkyl aluminum compound is one or more selected from a group consisting of triethyl aluminum, tripropyl aluminum, tri-n-butyl aluminum, tri-isobutyl aluminum, tri-n-hexyl aluminum, tri-n-octyl aluminum, tri-isobutyl aluminum, monohydrogen diethyl aluminum, monohydrogen diisobutyl aluminum, diethyl aluminum chloride, diisobutyl aluminum chloride, ethyl aluminum dichloride, Al(n-$C_6H_{13}$)$_3$, and Al(n-$C_8H_{17}$)$_3$.

Most preferably, the alkyl aluminum compound is triethyl aluminum and/or triisobutyl aluminum.

According to the present invention, an amount of the alkyl aluminum compound may be a conventional amount in the art. Preferably, a molar ratio of aluminum in the alkyl aluminum compound to titanium in the catalyst component is 1-2000:1. More preferably, the molar ratio of aluminum in the alkyl aluminum compound to titanium in the catalyst component is 10-500:1.

In the present invention, a type and a content of the external electron donor in the catalyst for olefin polymerization are not particularly limited. Preferably, a molar ratio of aluminum in the alkyl aluminum compound to the external electron donor compound is 1-200:1, more preferably 2.5-100:1.

According to the present invention, the use of the external electron donor compound in combination with the monocarboxylic ester compound and the diether compound can further increase the isotactic index of an olefin polymer obtained by the method of the present invention. The external electron donor compound may be any external electron donor compound commonly used in the art that can achieve the above purpose, and may be, for example, one or more selected from carboxylic acid, carboxylic acid anhydride, carboxylic acid ester, ketone, ether, alcohol, lactone, organophosphorus compounds and organosilicon compounds. Preferably, the external electron donor compound is an organosilicon compound represented by Formula XIV.

$$(R_{29})_{m'}(R_{30})_{p'}Si(OR_{31})_{q'}$$ Formula XIV

In Formula XIV, $R_{29}$, $R_{30}$, and $R_{31}$ are each independently $C_1$-$C_{18}$ hydrocarbon, and each optionally containing heteroatoms, the heteroatoms being one or more selected from F, Cl, Br, N and I; m' and p' are each independently an integer from 0 to 2; q' is an integer from 1 to 3; and a sum of m', p', and q' is 4.

Preferably, $R_{29}$ and $R_{30}$ are each independently selected from a group consisting of $C_3$-$C_{10}$ linear or branched alkyl, $C_3$-$C_{10}$ linear or branched alkenyl, substituted or unsubstituted $C_3$-$C_{10}$ alkylene, substituted or unsubstituted $C_3$-$C_{10}$ cycloalkyl, and substituted or unsubstituted $C_6$-$C_{10}$ aryl, and each optionally containing heteroatoms, the heteroatoms being one or more of F, Cl, Br, N, and I; and $R_{31}$ is $C_1$-$C_{10}$ linear or branched alkyl, more preferably methyl.

According to the present invention, specific examples of the external electron donor compound may include but are not limited to one or more selected from a group consisting of cyclohexylmethyldimethoxysilane, diisopropyldimethoxysilane, di-n-butyldimethoxysilane, diisobutyldimethoxysilane, diphenyldimethoxysilane, methyltert-butyldimethoxysilane, cyclohexyltrimethoxysilane, tert-butyltrimethoxysilane, tert-hexyltrimethoxysilane, dicyclopentyldimethoxysilane, 2-ethylpiperidyl-2-tert-butyldimethoxysilane, (1,1,1-trifluoro-2-propyl)-2-ethylpiperidyldimethoxysilane, and (1,1,1-trifluoro-2-propyl)-methyldimethoxysilane. These external electron donors may be used alone or in combinations.

More preferably, the external electron donor compound is cyclohexylmethyldimethoxysilane and/or dicyclopentyldimethoxysilane.

According to the present invention, during the preparation of the catalyst for olefin polymerization, the alkyl aluminum and the optional external electron donor compound may be mixed and reacted respectively with the catalyst component for olefin polymerization, or the alkyl aluminum and the optional external electron donor compound may be mixed first and then mixed and reacted with the catalyst component for olefin polymerization.

According to the present invention, when the catalyst for olefin polymerization is used in polymerization of an olefin, the catalyst component for olefin polymerization, the alkyl aluminum, and the optional external electron donor may be separately added to a polymerization reactor, or may be mixed first and then added to the polymerization reactor, or may be added to the polymerization reactor after the olefin is pre-polymerized according to a pre-polymerization method known in the art.

The present invention, in its third aspect, provides use of the above-mentioned catalyst in olefin polymerization.

The present invention, in its fourth aspect, provides an olefin polymerization method, comprising: contacting one or more olefins with the above-mentioned catalyst under olefin polymerization conditions. An improvement that is made in the present invention is the use of a new catalyst component and a new catalyst for olefin polymerization, and therefore specific types of the olefin(s) and methods and conditions of the polymerization reaction can all be the same as used in the existing technologies. The olefin is at least one olefin represented by a formula $CH_2$=CHR, where R is hydrogen or $C_1$-$C_6$ linear or branched alkyl. Specific examples of the olefin represented by the formula $CH_2$=CHR may include: ethylene, propylene, 1-n-butene, 1-n-pentene, 1-n-hexene, 1-n-octene, 4-methyl-1-pentene. Preferably, the olefin represented by the formula $CH_2$=CHR is ethylene, propylene, 1-n-butene, 1-n-hexene, and 4-methyl-1-pentene. More preferably, the olefin represented by the formula $CH_2$=CHR is propylene.

The olefin polymerization method of the present invention may be homopolymerization of a single olefin or copolymerization of a plurality of olefins.

According to the present invention, the polymerization reaction of the olefin can be carried out according to an existing method. Specifically, the polymerization reaction is carried out under the protection of an inert gas, in a liquid phase monomer or an inert solvent comprising a polymerized monomer, or in a gas phase, or in a combined polymerization process in a gas-liquid phase. The polymerization reaction may be carried out usually at a temperature of 0-150° C., preferably at a temperature of 60-90° C. The polymerization reaction may be carried out at a normal pressure or a higher pressure, which may be, for example, 0.01-10 MPa, preferably 0.01-6 MPa, more preferably 0.1-4 MPa. The pressure in the present invention refers to a gauge pressure. During the polymerization, hydrogen may be added to the reaction system as a polymer molecular weight regulator to adjust the molecular weight and the melt index of the polymer. In addition, during the polymerization reaction of the olefin, types and amounts of the inert gas and the solvent are well known to those skilled in the art, and will not be repeated herein.

The catalyst component for olefin polymerization of the present invention, by using the diether compound and the monocarboxylic ester compound as the internal electron donor, can effectively improve the hydrogen response and stereospecificity of the catalyst.

Other features and advantages of the present invention will be described in detail in the following specific embodiments.

The present invention is further illustrated by way of the following embodiments.

The specific embodiments of the present invention will be described in detail below. It should be appreciated that the specific embodiments described herein are only used to illustrate and explain, rather than limiting, the present invention.

In the following examples and comparative examples:
1. Average particle diameters and particle size distributions of a catalyst component and a carrier thereof for olefin polymerization were measured by a particle size analyzer namely Masters Sizer 2000 (manufactured by Malvern Instruments Ltd).
2. Apparent morphology of a carrier for an olefin polymerization catalyst was observed with an optical microscope namely Eclipse E200 purchased from Nikon.
3. Polymer melt index was measured according to the method provided in ASTM D1238-99.
4. Isotactic index of a polymer was measured by a heptane extraction method (extraction with boiling heptane for 6 hours). Specifically, 2 g of a dried polymer sample was placed in an extractor and extracted with boiling heptane for 6 hours. Resulting residual was dried to a constant weight to obtain a polymer. The isotactic index was a ratio of a weight (g) of the polymer to 2 (g).

Preparation Example 1

8.0 g (0.08 mol) of magnesium chloride, 56 mL (0.96 mol) of ethanol, 1 g (0.03 mol) of α-sulfur, and 1 g of PVP (polyvinylpyrrolidone) as a surfactant were added to a 0.6-L reactor, heated under stirring to 90° C. and reacted at 90° C.

for 2 hours, followed by adding 38 mL (0.48 mol) of epoxychloropropane, and then again reacted at 90° C. for 0.5 hour. After that, a resulting mixture was subjected to filter pressing. A product resulted from the filter pressing was washed with hexane five times. Finally, a resulting product was vacuum dried to obtain a spherical carrier Z1 of an olefin polymerization catalyst.

The spherical carrier Z1 of the olefin polymerization catalyst had an average particle diameter (D50) of 15 microns, and a particle size distribution ((D90-D10)/D50) of 0.6. As shown in FIG. 1, as it is observed through an optical microscope, particles of the spherical carrier Z1 of the olefin polymerization catalyst have relatively regular morphology and smooth surfaces, are basically all spherical, and have a relatively narrow particle size distribution, and among them are basically no non-spherical particles.

According to gas chromatography-mass spectrometry, elemental analysis, and nuclear magnetic characterization, components of Z1 include a magnesium-containing compound represented by a structural formula

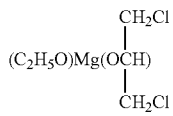

and sulfur. A molar ratio of magnesium in the magnesium-containing compound to sulfur is 1:0.2.

Preparation Example 2

300 mL of white oil, 8.0 g (0.08 mol) of magnesium chloride, 28 mL (0.48 mol) of ethanol, 0.3 g (0.009 mol) of β-sulfur, and 1 g of PVP (polyvinylpyrrolidone) as a surfactant were added to a 0.6-L reactor, heated under stirring to 100° C. and reacted at 100° C. for 1 hour, followed by adding 12.5 mL (0.16 mol) of epoxychloropropane, and then again reacted at 100° C. for 20 minutes. After that, a resulting mixture was subjected to filter pressing. A product resulted from the filter pressing was washed with hexane five times. Finally, a resulting product was vacuum dried to obtain a spherical carrier Z2 of an olefin polymerization catalyst.

The spherical carrier Z2 of the olefin polymerization catalyst had an average particle diameter (D50) of 18 microns, and a particle size distribution ((D90-D10)/D50) of 0.7. As it is observed through an optical microscope, particles of the spherical carrier Z2 of the olefin polymerization catalyst have relatively regular morphology and smooth surfaces, are basically all spherical, and have a relatively narrow particle size distribution, and among them are basically no non-spherical particles.

According to gas chromatography-mass spectrometry, elemental analysis, and nuclear magnetic characterization, components of Z2 include a magnesium-containing compound represented by a structural formula

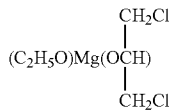

and sulfur. A molar ratio of magnesium in the magnesium-containing compound to sulfur is 1:0.01.

Preparation Example 3

300 mL of white oil, 8.0 g (0.08 mol) of magnesium chloride, 28 mL (0.48 mol) of ethanol, 0.2 g (0.006 mol) of α-sulfur, and 1 g of PVP (polyvinylpyrrolidone) as a surfactant were added to a 0.6-L reactor, heated under stirring to 100° C. and reacted at 100° C. for 1 hour, followed by adding 12.5 mL (0.16 mol) of epoxychloropropane, and then again reacted at 100° C. for 20 minutes. After that, a resulting mixture was subjected to filter pressing. A product resulted from the filter pressing was washed with hexane five times. Finally, a resulting product was vacuum dried to obtain a spherical carrier Z3 of an olefin polymerization catalyst.

The spherical carrier Z3 of the olefin polymerization catalyst had an average particle diameter (D50) of 20 microns, and a particle size distribution ((D90-D10)/D50) of 0.8. As it is observed through an optical microscope, particles of the spherical carrier Z3 of the olefin polymerization catalyst have relatively regular morphology and smooth surfaces, are basically all spherical, and have a relatively narrow particle size distribution, and among them are basically no non-spherical particles.

According to gas chromatography-mass spectrometry, elemental analysis, and nuclear magnetic characterization, components of Z3 include a magnesium-containing compound represented by a structural formula

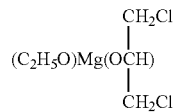

and sulfur. A molar ratio of magnesium in the magnesium-containing compound to sulfur is 1:0.007.

Preparation Example 4

0.08 mol of magnesium chloride, 0.96 mol of ethanol, and 1 g of PVP (polyvinylpyrrolidone) as a surfactant were added to a 0.6-L reactor, heated under stirring to 90° C. and reacted at 90° C. for 2 hours, followed by adding 38 mL (0.48 mol) of epoxychloropropane, and then again reacted at 90° C. for 0.5 hour. After that, a resulting mixture was subjected to filter pressing. A product resulted from the filter pressing was washed with hexane five times. Finally, a resulting product was vacuum dried to obtain a carrier DZ1 of an olefin polymerization catalyst.

Figure 2:
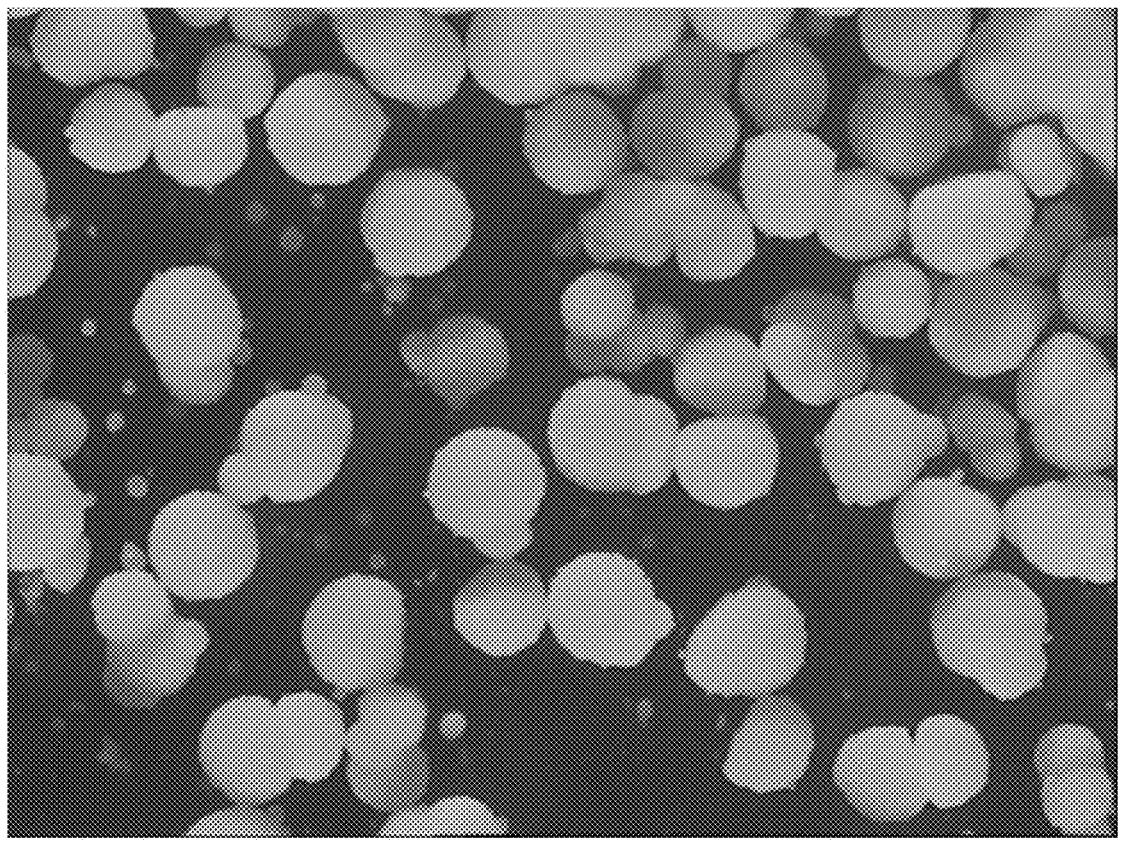
FIG. 2 is an optical microscope photograph of a spherical carrier (i.e., a magnesium source) for an olefin polymerization catalyst prepared in Preparation Example 4.

The carrier DZ1 of the olefin polymerization catalyst had an average particle diameter (D50) of 60 microns, and a particle size distribution ((D90-D10)/D50) of 1.3. Morphology of particles of the carrier observed through an optical microscope is as shown in FIG. 2. As can be seen from FIG. 2, among the particles of the carrier DZ1 of the olefin polymerization catalyst, there are non-spherical particles, and surfaces of the particles of the carrier DZ1 are relatively rough.

19

Example 1

(1) Preparation of a Catalyst Component for Olefin Polymerization:

90 ml of titanium tetrachloride was added to a 300-mL glass reaction flask, cooled to −20° C., followed by adding 8 g of the above spherical carrier Z1, and heated to 110° C. During the heating, 2 mmol of ethyl benzoate and 7 mmol of 2-isopropyl-2-isopentyl-1,3-dimethoxypropane were added. After a resulting mixture was maintained at 110° C. for 30 minutes, a liquid was filtered off. A resulting product was washed with titanium tetrachloride twice and washed with hexane five times, and then vacuum dried to obtain a solid catalyst component Cat-1.

(2) Propylene Polymerization:

Liquid phase bulk polymerization of propylene was carried out in a 5-L stainless steel autoclave. Under the protection of nitrogen, 1 ml of triethylaluminum in hexane (at a concentration of 0.5 mmol/ml), 0.1 ml of cyclohexylmethyldimethoxysilane (CHMMS) in hexane (at a concentration of 0.1 mmol/ml), and 6 mg of the above solid catalyst component Cat-1 were added successively to the autoclave. After the autoclave was closed, 6.5 L of hydrogen (standard volume) and 2.3 L of liquid propylene were added. A resulting mixture was heated to 70° C., reacted for 1 hour, and then cooled, followed by pressure release and discharging.

An obtained propylene homopolymer was dried and then weighed and analyzed. Results are shown in Table 1.

Example 2

(1) Preparation of a Catalyst Component for Olefin Polymerization:

90 ml of titanium tetrachloride was added to a 300-mL glass reaction flask, cooled to −20° C., followed by adding 8 g of the above solid component Z2, and heated to 110° C. During the heating, 2 mmol of ethyl o-methoxybenzoate and 9 mmol of 2-isopropyl-2-isopentyl-1,3-dimethoxypropane were added. After a resulting mixture was maintained at 110° C. for 30 minutes, a liquid was filtered off. A resulting product was washed with titanium tetrachloride twice and washed with hexane five times, and then vacuum dried to obtain a solid catalyst component Cat-2.

(2) Propylene Polymerization:

Liquid phase bulk polymerization of propylene was carried out in a 5-L stainless steel autoclave. Under the protection of nitrogen, 1 ml of triethylaluminum in hexane (at a concentration of 0.5 mmol/ml), 0.1 ml of cyclohexylmethyldimethoxysilane (CHMMS) in hexane (at a concentration of 0.1 mmol/ml), and 6 mg of the above solid catalyst component Cat-2 were added successively to the autoclave. After the autoclave was closed, 6.5 L of hydrogen (standard volume) and 2.3 L of liquid propylene were added. A resulting mixture was heated to 70° C., reacted for 1 hour, and then cooled, followed by pressure release and discharging.

An obtained propylene homopolymer was dried and then weighed and analyzed. Results are shown in Table 1.

Example 3

(1) Preparation of a Catalyst Component for Olefin Polymerization:

90 ml of titanium tetrachloride was added to a 300-mL glass reaction flask, cooled to −20° C., followed by adding 8 g of the above solid component Z3, and heated to 110° C.

20

During the heating, 0.5 mmol of ethyl o-methoxybenzoate and 7 mmol of 2-isopropyl-2-isopentyl-1,3-dimethoxypropane were added. After a resulting mixture was maintained at 110° C. for 30 minutes, a liquid was filtered off. A resulting product was washed with titanium tetrachloride twice and washed with hexane five times, and then vacuum dried to obtain a solid catalyst component Cat-3.

(2) Propylene Polymerization:

Liquid phase bulk polymerization of propylene was carried out in a 5-L stainless steel autoclave. Under the protection of nitrogen, 1 ml of triethylaluminum in hexane (at a concentration of 0.5 mmol/ml), 0.1 ml of cyclohexylmethyldimethoxysilane (CHMMS) in hexane (at a concentration of 0.1 mmol/ml), and 6 mg of the above solid catalyst component Cat-3 were added successively to the autoclave. After the autoclave was closed, 6.5 L of hydrogen (standard volume) and 2.3 L of liquid propylene were added. A resulting mixture was heated to 70° C., reacted for 1 hour, and then cooled, followed by pressure release and discharging.

An obtained propylene homopolymer was dried and then weighed and analyzed. Results are shown in Table 1.

Example 4

A catalyst component was prepared and liquid phase bulk polymerization of propylene was carried out in a same way as those in Example 2, except that that amounts of ethyl o-methoxybenzoate and 2-isopropyl-2-isopentyl-1,3-dimethoxypropane added during the heating were 5.6 mmol and 8 mmol, respectively. The obtained catalyst component for olefin polymerization was Cat-4.

An obtained propylene homopolymer was dried and then weighed and analyzed. Results are shown in Table 1.

Example 5

A catalyst component was prepared and liquid phase bulk polymerization of propylene was carried out in a same way as those in Example 2, except that what were added during the heating were 1.1 mmol of ethyl o-methoxybenzoate and 7.3 mmol of 9,9-dimethoxymethylfluorene rather than o-methoxybenzoate and 2-isopropyl-2-isopentyl-1,3-dimethoxypropane. The obtained catalyst component for olefin polymerization was Cat-5.

An obtained propylene homopolymer was dried and then weighed and analyzed. Results are shown in Table 1.

Example 6

A catalyst component was prepared and liquid phase bulk polymerization of propylene was carried out in a same way as those in Example 2, except that during the heating 2.8 mmol of ethyl o-methoxybenzoate and 8 mmol of 9,9-dimethoxymethylfluorene were added. The obtained catalyst component for olefin polymerization was Cat-6.

An obtained propylene homopolymer was dried and then weighed and analyzed. Results are shown in Table 1.

Example 7

A catalyst component was prepared and liquid phase bulk polymerization of propylene was carried out in a same way as those in Example 2, except that during the heating 0.8 mmol of ethyl o-methoxybenzoate and 8 mmol of 2-isopropyl-2-isopentyl-1,3-dimethoxypropane were added. The obtained catalyst component for olefin polymerization was Cat-7.

An obtained propylene homopolymer was dried and then weighed and analyzed. Results are shown in Table 1.

Example 8

A catalyst component was prepared and liquid phase bulk polymerization of propylene was carried out in a same way as those in Example 2, except that during the heating 5 mmol of ethyl o-methoxybenzoate and 7 mmol of 2-isopropyl-2-isopentyl-1,3-dimethoxypropane were added. The obtained catalyst component for olefin polymerization was Cat-8.

An obtained propylene homopolymer was dried and then weighed and analyzed. Results are shown in Table 1.

Example 9

A catalyst component was prepared and liquid phase bulk polymerization of propylene was carried out in a same way as those in Example 2, except that during the heating 2.5 mmol of ethyl o-methoxybenzoate and 8.5 mmol of 2-isopropyl-2-isopentyl-1,3-dimethoxypropane were added. The obtained catalyst component for olefin polymerization was Cat-9.

An obtained propylene homopolymer was dried and then weighed and analyzed. Results are shown in Table 1.

Example 10

A catalyst component was prepared and liquid phase bulk polymerization of propylene was carried out in a same way as those in Example 2, except that during the heating 3 mmol of ethyl o-methoxybenzoate and 8 mmol of 2-isopropyl-2-isopentyl-1,3-dimethoxypropane were added. The obtained catalyst component for olefin polymerization was Cat-10.

An obtained propylene homopolymer was dried and then weighed and analyzed. Results are shown in Table 1.

Example 11

A catalyst component was prepared and liquid phase bulk polymerization of propylene was carried out in a same way as those in Example 2, except that during the heating 2.3 mmol of ethyl o-hydroxybenzoate and 8.7 mmol of 2-isopropyl-2-isopentyl-1,3-dimethoxypropane were added. The obtained catalyst component for olefin polymerization was Cat-11.

An obtained propylene homopolymer was dried and then weighed and analyzed. Results are shown in Table 1.

Example 12

A catalyst component was prepared and liquid phase bulk polymerization of propylene was carried out in a same way as those in Example 2, except that during the heating 4 mmol of ethyl benzoate and 7 mmol of 9,9-dimethoxymethylfluorene were added. The obtained catalyst component for olefin polymerization was Cat-12.

An obtained propylene homopolymer was dried and then weighed and analyzed. Results are shown in Table 1.

Example 13

(1) Preparation of a Catalyst Component 90 ml (820 mmol) of titanium tetrachloride was added to a 300-ml glass reaction flask, and cooled to −20° C., followed by adding 37 mmol (based on magnesium element) of a magnesium halide carrier (prepared according to the method disclosed in Example 1 of CN1330086A), and then heated to 110° C. During the heating, 2.5 mmol of ethyl o-ethoxybenzoate and 7.1 mmol of 2-isopropyl-2-isopentyl-1,3-dimethoxypropane were added. After a resulting mixture was maintained at 110° C. for 30 minutes, a liquid was filtered off. A resulting product was washed with titanium tetrachloride twice and washed with hexane five times, and then vacuum dried to obtain a catalyst component Cat-13 for olefin polymerization.

(2) Liquid Phase Bulk Polymerization of Propylene

Liquid phase bulk polymerization of propylene was carried out in a 5-L stainless steel autoclave. Under the protection of nitrogen, 1 ml of triethylaluminum in hexane (at a concentration of 0.5 mmol/ml), 0.1 ml of cyclohexylmethyldimethoxysilane (CHMMS) in hexane (at a concentration of 0.1 mmol/ml), and 8 mg of the above catalyst component Cat-13 for olefin polymerization were added successively to the autoclave. After the autoclave was closed, 6.5 L of hydrogen (standard volume) and 2.3 L of liquid propylene were added. A resulting mixture was heated to 70° C., reacted for 1 hour, and then cooled, followed by pressure release and discharging. An obtained propylene homopolymer was dried and then weighed and analyzed. Results are shown in Table 1.

Example 14

A catalyst component was prepared and liquid phase bulk polymerization of propylene was carried out in a same way as those in Example 13, except that the internal electron donor added during the heating was 1.5 mmol of ethyl o-ethoxybenzoate and 10 mmol of 2-isopropyl-2-isopentyl-1,3-dimethoxypropane. The obtained catalyst component for olefin polymerization was Cat-14.

An obtained propylene homopolymer was dried and then weighed and analyzed. Results are shown in Table 1.

Comparative Example 1

A catalyst component was prepared and liquid phase bulk polymerization of propylene was carried out in a same way as those in Example 2, except that the internal electron donor added during the heating was 9 mmol of 2-isopropyl-2-isopentyl-1,3-dimethoxypropane. The obtained catalyst component for olefin polymerization was Com-Cat-1.

An obtained propylene homopolymer was dried and then weighed and analyzed. Results are shown in Table 1.

Comparative Example 2

A catalyst component was prepared and liquid phase bulk polymerization of propylene was carried out in a same way as those in Example 2, except that the internal electron donor added during the heating was 9 mmol of ethyl o-methoxybenzoate. The obtained catalyst component for olefin polymerization was Com-Cat-2.

An obtained propylene homopolymer was dried and then weighed and analyzed. Results are shown in Table 1.

Comparative Example 3

A catalyst component was prepared and liquid phase bulk polymerization of propylene was carried out in a same way as those in Example 2, except that the internal electron donor added during the heating was 9 mmol of ethyl benzoate. The obtained catalyst component for olefin polymerization was Com-Cat-3.

An obtained propylene homopolymer was dried and then weighed and analyzed. Results are shown in Table 1.

Comparative Example 6

A catalyst component was prepared and liquid phase bulk polymerization of propylene was carried out in a same way as those in Example 2, except that the internal electron donor added during the heating was 5 mmol of ethyl o-ethoxybenzoate and 5 mmol of 2-isopropyl-2-isopentyl-1,3-dimethoxypropane. The obtained catalyst component for olefin polymerization was Com-Cat-6.

An obtained propylene homopolymer was dried and then weighed and analyzed. Results are shown in Table 1.

TABLE 1

| | Catalyst component | Internal electron donor A added during preparation | Internal electron donor B added during preparation | Molar ration of A to B in catalyst component | Isotactic index of polymer I.I (%) | Melt index of polymer M.I (g/10 min) |
|---|---|---|---|---|---|---|
| Example 1 | Cat-1 | ethyl benzoate | ether | 0.05:1 | 98.0 | 73 |
| Example 2 | Cat-2 | ethyl o-methoxybenzoate | ether | 0.03:1 | 98.1 | 76 |
| Example 3 | Cat-3 | ethyl o-methoxybenzoate | ether | 0.008:1 | 97.2 | 79 |
| Example 4 | Cat-4 | ethyl o-methoxybenzoate | ether | 0.40:1 | 97.2 | 70 |
| Example 5 | Cat-5 | ethyl o-ethoxybenzoate | fluorene ether | 0.09:1 | 97.6 | 74 |
| Example 6 | Cat-6 | ethyl o-methoxybenzoate | fluorene ether | 0.23:1 | 97.5 | 70 |
| Example 7 | Cat-7 | ethyl o-methoxybenzoate | ether | 0.005:1 | 97.0 | 76 |
| Example 8 | Cat-8 | ethyl o-methoxybenzoate | ether | 0.64:1 | 96.9 | 69 |
| Example 9 | Cat-9 | ethyl o-methoxybenzoate | ether | 0.05:1 | 98.2 | 75 |
| Example 10 | Cat-10 | ethyl o-methoxybenzoate | ether | 0.09:1 | 98.3 | 73 |
| Example 11 | Cat-11 | ethyl o-hydroxybenzoate | ether | 0.12:1 | 98.1 | 75 |
| Example 12 | Cat-12 | ethyl benzoate | fluorene ether | 0.34:1 | 97.4 | 72 |
| Example 13 | Cat-13 | ethyl o-ethoxybenzoate | ether | 0.12:1 | 97.6 | 80 |
| Example 14 | Cat-14 | ethyl o-ethoxybenzoate | ether | 0.10:1 | 97.3 | 79 |
| Comparative Example 1 | Com-Cat-1 | 0 | ether | | 95.3 | 79 |
| Comparative Example 2 | Com-Cat-2 | ethyl o-methoxybenzoate | 0 | | 91.0 | 40 |
| Comparative Example 3 | Com-Cat-3 | ethyl benzoate | 0 | | 90.2 | 36 |
| Comparative Example 4 | Com-Cat-4 | ethyl o-ethoxybenzoate | fluorene ether | 0.003:1 | 95.2 | 68 |
| Comparative Example 5 | Com-Cat-5 | ethyl o-methoxybenzoate | ether | 0.75:1 | 94.5 | 45 |
| Comparative Example 6 | Com-Cat-6 | ethyl o-ethoxybenzoate | ether | 0.80:1 | 94.5 | 38 |

Comparative Example 4

A catalyst component was prepared and liquid phase bulk polymerization of propylene was carried out in a same way as those in Example 13, except that the internal electron donor added during the heating was 0.3 mmol of ethyl o-ethoxybenzoate and 8.5 mmol of 9,9-dimethoxymethylfluorene. The obtained catalyst component for olefin polymerization was Com-Cat-4.

An obtained propylene homopolymer was dried and then weighed and analyzed. Results are shown in Table 1.

Comparative Example 5

A catalyst component was prepared and liquid phase bulk polymerization of propylene was carried out in a same way as those in Example 2, except that the internal electron donor added during the heating was 7 mmol of ethyl o-methoxybenzoate and 9 mmol of 2-isopropyl-2-isopentyl-1,3-dimethoxypropane. The obtained catalyst component for olefin polymerization was Com-Cat-5.

An obtained propylene homopolymer was dried and then weighed and analyzed. Results are shown in Table 1.

In Table 1, "ether" represents "2-isopropyl-2-isopentyl-1,3-dimethoxypropane"; "fluorenyl ether" represents "9,9-dimethoxymethylfluorene"; contents of internal electron donors A and B in the catalyst component were measured by a gas chromatograph (thermoelectric Trace GC Ultra).

TABLE 2

| | Average particle diameter of catalyst particles (μm) |
|---|---|
| Example 1 | 13 |
| Example 2 | 17 |
| Example 3 | 18 |
| Example 4 | 16 |
| Example 5 | 17 |
| Example 6 | 16 |

As can be seen from the results of the Examples and Comparative Examples in Table 1, when the catalyst component of the present invention in which the internal electron donor comprises both a monocarboxylic ester compound and a diether compound, especially when the molar ratio of the monocarboxylic ester compound to the diether compound is (0.0035-0.7):1, preferably (0.0040-0.7):1, more preferably (0.00454-0.6):1, further more preferably (0.005-0.5):1, still more preferably (0.01-0.35):1, is used, the prepared polypropylene has a significantly improved isotactic index as well as a high melt index. In other words, the catalyst of the present invention can be used to prepare a polymer with both a high isotactic index and a high melt flow index.

The catalyst of the present invention free of a phthalate compound (plasticizer) has characteristics of high stereospecificity and high hydrogen response.

It should be noted that the above described embodiments are only used to explain the present invention and do not constitute any limitation to the present invention. The present invention may be modified within the scope of the claims of the present invention as required, and may be revised without departing from the scope and spirit of the present invention. Although the present invention described herein relates to specific methods, materials, and embodiments, it does not mean that the present invention is limited to the specific embodiments disclosed therein. On the contrary, the present invention can be extended to all other methods and applications with the same functions.

The invention claimed is:

1. A catalyst component for olefin polymerization, comprising magnesium, titanium, a halogen, and an internal electron donor, wherein the internal electron donor comprises a monocarboxylic ester compound and a diether compound, a molar ratio of the monocarboxylic ester compound to the diether compound being (0.0035-0.7):1,
   wherein the catalyst component is a product produced from a reaction of a magnesium source comprising sulfur, a titanium source, and the internal electron donor;
   wherein the magnesium source comprises a magnesium compound of Formula IV,

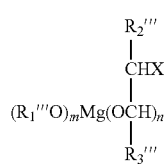

Formula IV wherein in Formula IV,
   $R_1'''$ is selected from the group consisting of substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl,
   $R_2'''$ and $R_3'''$ are identical to or different, each independently selected from the group consisting of hydrogen, substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl, and
   X is a halogen, m is 0.1-1.9, n is 0.1-1.9, and m+n=2.

2. The catalyst component according to claim 1, wherein the molar ratio of the monocarboxylic ester compound to the diether compound is (0.001-0.35):1.

3. The catalyst component according to claim 1, wherein the diether compound is a diether compound of Formula I,

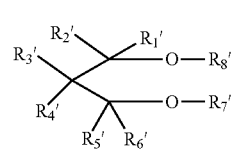

Formula I wherein in Formula I,
   $R_1'$, $R_2'$, $R_3'$, $R_4'$, $R_5'$ and $R_6'$ are identical to or different from each other, each independently selected from the group consisting of hydrogen, halogen, substituted or unsubstituted $C_1$-$C_{20}$ linear or branched alkyl, substituted or unsubstituted $C_3$-$C_{20}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl; or, two or more of $R_1'$, $R_2'$, $R_3'$, $R_4'$, $R_5'$ and $R_6'$ are connected to form a ring;
   $R_7'$ and $R_8'$ are identical to or different, each independently selected from the group consisting of substituted or unsubstituted $C_1$-$C_{20}$ linear or branched alkyl, substituted or unsubstituted $C_3$-$C_{20}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl; and
   the monocarboxylic ester compound is selected from an aromatic monocarboxylic ester and an aliphatic monocarboxylic ester.

4. The catalyst component according to claim 1, wherein the diether compound is a 1,3-diether compound of Formula II,

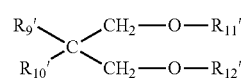

Formula II wherein in Formula II,
   $R_9'$ and $R_{10}'$ are identical to or different, each independently selected from the group consisting of hydrogen, halogen, substituted or unsubstituted $C_1$-$C_{18}$ linear or branched alkyl, substituted or unsubstituted $C_3$-$C_{18}$ cycloalkyl, substituted or unsubstituted $C_6$-$C_{18}$ aryl, substituted or unsubstituted $C_7$-$C_{18}$ aralkyl, and substituted or unsubstituted $C_7$-$C_{18}$ alkaryl; or, $R_9'$ and $R_{10}'$ are connected to form a ring; and
   $R_{11}'$ and $R_{12}'$ are identical to or different, each independently being substituted or unsubstituted $C_1$-$C_{10}$ linear or branched alkyl.

5. The catalyst component according to claim 3, wherein the aliphatic monocarboxylic ester is a monoester formed by an aliphatic monocarboxylic acid having 2-10 carbon atoms and an aliphatic mono- or polyhydric alcohol having 1-15 carbon atoms or an aromatic alcohol having 6-15 carbon atoms; and
   the aromatic monocarboxylic ester is a monoester formed by an aromatic monocarboxylic acid having 7-10 carbon atoms and an aliphatic mono- or polyhydric alcohol having 1-15 carbon atoms or an aromatic alcohol having 6-15 carbon atoms.

6. The catalyst component according to claim 1, wherein the aromatic monocarboxylic ester is an aromatic monocarboxylic ester of Formula III:

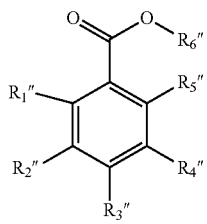

Formula III wherein in Formula III,
$R_1''$, $R_2''$, $R_3''$, $R_4''$, and $R_5''$ are identical to or different, each independently selected from the group consisting of hydrogen, hydroxyl, halogen, amino, substituted or unsubstituted $C_1$-$C_{10}$ linear or branched alkyl, substituted or unsubstituted $C_1$-$C_{10}$ alkoxy, substituted or unsubstituted $C_3$-$C_{10}$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl; or any two of $R_1''$, $R_2''$, $R_3''$, $R_4''$, and $R_5''$ are connected to form an aromatic ring or an aliphatic ring; and $R_6''$ is selected from the group consisting of substituted or unsubstituted $C_1$-$C_{10}$ linear or branched alkyl, substituted or unsubstituted $C_3$-$C_{10}$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl.

7. The catalyst component according to claim 1, wherein in Formula IV,
$R_1'''$ is selected from the group consisting of substituted or unsubstituted $C_1$-$C_8$ linear alkyl, substituted or unsubstituted $C_3$-$C_8$ branched alkyl, substituted or unsubstituted $C_3$-$C_8$ cycloalkyl, substituted or unsubstituted $C_6$-$C_{15}$ aryl, substituted or unsubstituted $C_7$-$C_{15}$ aralkyl, and substituted or unsubstituted $C_7$-$C_{15}$ alkaryl;
$R_2'''$ and $R_3'''$ mare each independently selected from the group consisting of hydrogen, substituted or unsubstituted $C_1$-$C_{10}$ linear alkyl, substituted or unsubstituted $C_3$-$C_8$ branched alkyl, substituted or unsubstituted $C_3$-$C_8$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl;
X is chlorine or bromine;
the titanium source is selected from the group consisting of titanium halide, titanium alkoxide halide, and titanium alkoxide.

8. The catalyst component according to claim 1, wherein a molar ratio of sulfur to magnesium in the magnesium source is q:1, wherein $0<q\leq0.5$.

9. The catalyst component according to claim 1, wherein the magnesium source is prepared by a method comprising the following steps:
(1) preparing a mixture, wherein the mixture comprises elemental sulfur, a magnesium halide represented by a general formula $MgX_1Y$, a compound represented by a general formula $R_1OH$, an optional inert liquid medium, and an optional surfactant; and
(2) subjecting the mixture obtained in step (1) to a contact reaction with an ethylene oxide compound;
wherein in the general formula $MgX_1Y$, $X_1$ is a halogen; and Y is selected from the group consisting of halogen, substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_1$-$C_{10}$ alkoxy, substituted or unsubstituted $C_6$-$C_{20}$ aryloxy, substituted or unsubstituted $C_7$-$C_{20}$ aralkyl, and substituted or unsubstituted $C_7$-$C_{20}$ alkaryl;
in the general formula $R_1OH$ $R_1$ is selected from the group consisting of substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl; and
the ethylene oxide compound is of Formula V:

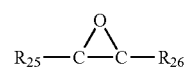

Formula V wherein in Formula V, $R_{25}$ and $R_{26}$ are each independently selected from the group consisting of hydrogen, substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl.

10. The catalyst component according to claim 9, wherein based on 1 mol of the magnesium halide represented by the general formula $MgX_1Y$, the elemental sulfur is present in an amount of 0.0001-0.5 mol, the compound represented by the general formula $R_1OH$ is present in an amount of 4-30 mol, and the ethylene oxide compound is present in an amount of 1-10 mol.

11. The catalyst component according to claim 9, wherein in step (1), the heating is conducted at a temperature of 80-120° C. for a time period of 0.5-5 hours; and
in step (2), the contact reaction is carried out at a temperature of 40-120° C. for a time period of 15-60 minutes.

12. The catalyst component according to claim 9, wherein the inert liquid medium is a silicone oil solvent and/or a hydrocarbon solvent; and/or
based on 1 mol of the magnesium halide represented by the general formula $MgX_1Y$, the inert liquid medium is present in an amount of 0.8-10 L.

13. The catalyst component according to claim 9, wherein the surfactant is at least one selected from the group consisting of polyvinylpyrrolidone, polyethylene glycol, polyvinyl alcohol, polyacrylic acid, polyacrylate, polyacrylamide, polystyrene sulfonate, naphthalenesulfonic acid formaldehyde condensate, condensed alkyl phenyl ether sulfate, condensed alkyl phenol polyoxyethylene ether phosphate, oxyalkyl acrylate copolymer modified polyethyleneimine, 1-dodeca-4-vinylpyridine bromide polymer, polyvinylbenzyltrimethylamine salt, polyethylene oxide propylene oxide block copolymer, polyvinylpyrrolidone vinyl acetate copolymer, alkyl phenyl polyoxyethylene ether, and polyalkyl methacrylate; and/or
based on 1 mol of the magnesium halide represented by the general formula $MgX_1Y$, the surfactant is present in an amount of 1-20 g.

14. The catalyst component according to claim 9, wherein in the general formula $MgX_1Y$, $X_1$ is chlorine or bromine, and Y is chlorine, bromine, $C_1$-$C_5$ alkoxy, or $C_6$-$C_{10}$ aryloxy; and/or
   in the general formula $R_1OH$, $R_1$ is $C_1$-$C_8$ alkyl; and/or
   in the ethylene oxide compound of Formula V, $R_{25}$ and $R_{26}$ are each independently hydrogen, $C_1$-$C_3$ alkyl, or $C_1$-$C_3$ halogenated alkyl.

15. The catalyst component according to claim 1, wherein in the catalyst component, a weight ratio of titanium as titanium element, to magnesium as magnesium element, to the halogen, and to the internal electron donor is 1:2-15:8-30:2-15.

16. A catalyst for olefin polymerization, comprising:
   (1) the catalyst component according to claim 1;
   (2) at least one alkyl aluminum compound; and
   (3) an optional external electron donor compound.

17. An olefin polymerization method, comprising: contacting the olefin with an catalyst according to claim 16 under olefin polymerization condition, wherein the olefin comprises at least one of olefin of formula $CH_2\!\!=\!\!CHR$, R being hydrogen, $C_1$-$C_6$ linear alkyl, or $C_1$-$C_6$ branched alkyl.

18. The catalyst component according to claim 3, wherein in Formula I,
   $R_1'$, $R_2'$, $R_3'$, $R_4'$, $R_5'$ and $R_6'$ are identical to or different, each independently selected from the group consisting of hydrogen, halogen, substituted or unsubstituted $C_1$-$C_{18}$ linear or branched alkyl, substituted or unsubstituted $C_3$-$C_{18}$ cycloalkyl, substituted or unsubstituted $C_6$-$C_{18}$ aryl, substituted or unsubstituted $C_7$-$C_{18}$ aralkyl, and substituted or unsubstituted $C_7$-$C_{18}$ alkaryl; or, two or more of $R_1'$, $R_2'$, $R_3'$, $R_4$, $R_5'$, and $R_6'$ are connected to form a ring;
   $R_7'$ and $R_8'$ are identical to or different, each independently selected from the group consisting of substituted or unsubstituted $C_1$-$C_{10}$ linear or branched alkyl, substituted or unsubstituted $C_3$-$C_{10}$ cycloalkyl, substituted or unsubstituted $C_6$-$C_{15}$ aryl, substituted or unsubstituted $C_7$-$C_{15}$ aralkyl, and substituted or unsubstituted $C_7$-$C_{15}$ alkaryl.

19. The catalyst component according to claim 4, wherein in Formula II,
   $R_9'$ and $R_{10}'$ are identical to or different, each independently selected from the group consisting of hydrogen, halogen, substituted or unsubstituted $C_1$-$C_{10}$ linear or branched alkyl, substituted or unsubstituted $C_3$-$C_{10}$ cycloalkyl, substituted or unsubstituted $C_6$-$C_{15}$ aryl, substituted or unsubstituted $C_7$-$C_{15}$ aralkyl, and substituted or unsubstituted $C_7$-Cis alkaryl; or, $R_9'$ and $R_{10}'$ are connected to form a fluorene ring.

20. The catalyst component according to claim 7, wherein in Formula IV,
   $R_1'''$ is selected from the group consisting of substituted or unsubstituted $C_1$-$C_6$ linear alkyl, substituted or unsubstituted $C_3$-$C_6$ branched alkyl, substituted or unsubstituted $C_3$-$C_6$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl;
   $R_2'''$ and $R_3'''$ are identical to or different, each independently selected from the group consisting of hydrogen, substituted or unsubstituted $C_1$-$C_6$ linear alkyl, substituted or unsubstituted $C_3$-$C_6$ branched alkyl, substituted or unsubstituted $C_3$-$C_6$ cycloalkyl, substituted or unsubstituted $C_6$-$C_8$ aryl, substituted or unsubstituted $C_7$-$C_9$ aralkyl, and substituted or unsubstituted $C_7$-$C_9$ alkylaryl; and
   the titanium source comprises a compound represented by a general formula $Ti(OR')_{3-a}Z_a$ and/or $Ti(OR')_{4-b}Z_b$, wherein R' is $C_1$-$C_{20}$ alkyl; Z is F, Cl, Br or I; a is an integer from 1 to 3; and b is an integer from 1 to 4.

21. The catalyst component according to claim 9,
   wherein in step (1), the mixture is obtained by mixing the elemental sulfur, the magnesium halide represented by the general formula $MgX_1Y$, the compound represented by the general formula $R_1OH$, the optional inert liquid medium, and the optional surfactant together and then heating a resulting mixture;
   wherein in the general formula $MgX_1Y$, $X_1$ is chlorine or bromine;
   wherein in the general formula $R_1OH$, $R_1$ is selected from the group consisting of substituted or unsubstituted $C_1$-$C_8$ linear alkyl, substituted or unsubstituted $C_3$-$C_8$ branched alkyl, substituted or unsubstituted $C_3$-$C_8$ cycloalkyl, substituted or unsubstituted $C_6$-$C_{15}$ aryl, substituted or unsubstituted $C_7$-$C_{15}$ aralkyl, and substituted or unsubstituted $C_7$-$C_{15}$ alkaryl;
   wherein in Formula V, $R_{25}$ and $R_{26}$ are each independently selected from the group consisting of hydrogen, substituted or unsubstituted $C_1$-$C_8$ linear alkyl, substituted or unsubstituted $C_3$-$C_8$ branched alkyl, substituted or unsubstituted $C_3$-$C_8$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl.

22. The catalyst component according to claim 9,
   wherein in the general formula $R_1OH$, $R_1$ is selected from the group consisting of substituted or unsubstituted $C_1$-$C_6$ linear alkyl, substituted or unsubstituted $C_3$-$C_6$ branched alkyl, substituted or unsubstituted $C_3$-$C_6$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl; and
   wherein in Formula V, $R_{25}$ and $R_{26}$ are each independently selected from the group consisting of hydrogen, substituted or unsubstituted $C_1$-$C_6$ linear alkyl, substituted or unsubstituted $C_3$-$C_6$ branched alkyl, substituted or unsubstituted $C_3$-$C_6$ cycloalkyl, substituted or unsubstituted $C_6$-$C_8$ aryl, substituted or unsubstituted $C_7$-$C_9$ aralkyl, and substituted or unsubstituted $C_7$-$C_9$ alkylaryl.

23. The catalyst component according to claim 12, wherein the inert liquid medium is at least one selected from the group consisting of kerosene, paraffin oil, petrolatum oil, white oil, methyl silicone oil, ethyl silicone oil, methyl ethyl silicone oil, phenyl silicone oil, and methyl phenyl silicone oil.

24. The catalyst component according to claim 14, wherein the magnesium halide represented by the general formula $MgX_1Y$ is at least one selected from the group consisting of magnesium chloride, magnesium bromide, phenoxymagnesium chloride, isopropoxymagnesium chloride, and n-butoxymagnesium chloride; and/or
   the compound represented by the general formula $R_1OH$ is at least one selected from the group consisting of ethanol, n-propanol, isopropanol, n-butanol, isobutanol, n-pentanol, isopentanol, n-hexanol, 2-ethylhexanol, and n-octanol; and/or
   the ethylene oxide compound is at least one selected from the group consisting of ethylene oxide, epoxypropane, epoxybutane, epoxychloropropane, epoxychlorobutane, epoxybromopropane, and epoxybromobutane.

\* \* \* \* \*